US011522184B2

United States Patent
Kawasaki et al.

(10) Patent No.: US 11,522,184 B2
(45) Date of Patent: Dec. 6, 2022

(54) POSITIVE ELECTRODE ACTIVE MATERIAL FOR NON-AQUEOUS ELECTROLYTE SECONDARY BATTERY AND METHOD FOR PRODUCING THE SAME

(71) Applicant: NICHIA CORPORATION, Anan (JP)

(72) Inventors: Tomooki Kawasaki, Anan (JP); Ken-ichi Kobayashi, Tokushima (JP)

(73) Assignee: NICHIA CORPORATION, Anan (JP)

(*) Notice: Subject to any disclaimer, the term of this patent is extended or adjusted under 35 U.S.C. 154(b) by 335 days.

(21) Appl. No.: 16/585,994

(22) Filed: Sep. 27, 2019

(65) Prior Publication Data
US 2020/0106097 A1    Apr. 2, 2020

(30) Foreign Application Priority Data

Sep. 28, 2018 (JP) .............. JP2018-184121

(51) Int. Cl.
*H01M 4/525* (2010.01)
*H01M 4/505* (2010.01)
*H01M 4/131* (2010.01)
*H01M 4/38* (2006.01)
*H01M 4/36* (2006.01)

(52) U.S. Cl.
CPC .......... *H01M 4/525* (2013.01); *H01M 4/131* (2013.01); *H01M 4/364* (2013.01); *H01M 4/382* (2013.01); *H01M 4/505* (2013.01)

(58) Field of Classification Search
CPC ...... H01M 4/525; H01M 4/131; H01M 4/364; H01M 4/382; H01M 4/505
See application file for complete search history.

(56) References Cited

U.S. PATENT DOCUMENTS

| | | | |
|---|---|---|---|
| 2007/0218360 A1 | 9/2007 | Tabuchi et al. | |
| 2010/0227221 A1 | 9/2010 | Chang et al. | |
| 2012/0270107 A1 | 10/2012 | Toya et al. | |
| 2013/0244111 A1* | 9/2013 | Cho ........... | B82Y 30/00 |
| | | | 429/219 |

FOREIGN PATENT DOCUMENTS

| | | |
|---|---|---|
| CN | 103594696 A | 2/2014 |
| CN | 104078668 A | 10/2014 |
| JP | 2002075367 A | 3/2002 |
| JP | 2003292322 A | 10/2003 |
| JP | 2005166558 A | 6/2005 |
| JP | 2006012433 A | 1/2006 |
| JP | 20080063211 A | 3/2008 |
| JP | 2009526735 A | 7/2009 |
| JP | 2011116580 A | 6/2011 |
| JP | 2011146390 A | 7/2011 |
| JP | 2013191540 A | 9/2013 |
| JP | 2018116856 A | 7/2018 |

* cited by examiner

*Primary Examiner* — Jayne L Mershon
(74) *Attorney, Agent, or Firm* — Hunton Andrews Kurth LLP (57) ABSTRACT

A positive electrode active material for a non-aqueous electrolyte secondary battery that includes a lithium transition metal composite oxide having a spinel structure and containing nickel and manganese is provided. The positive electrode active material includes a first surface region having a chemical composition with a molar ratio of nickel to manganese of 0.1 or less on the surface of the lithium transition metal composite oxide.

10 Claims, 4 Drawing Sheets

POSITIVE ELECTRODE ACTIVE MATERIAL FOR NON-AQUEOUS ELECTROLYTE SECONDARY BATTERY AND METHOD FOR PRODUCING THE SAME

CROSS-REFERENCE TO RELATED APPLICATIONS

This application claims priority to Japanese Patent Application No. 2018-184121, filed on Sep. 28, 2018, the disclosure of which is hereby incorporated by reference in its entirety.

BACKGROUND

Technical Field

The present disclosure relates to a positive electrode active material for a non-aqueous electrolyte secondary battery and a method for producing the positive electrode active material.

Description of the Related Art

Electronic devices, such as cellular phones and VTRs, are increasingly getting smaller. This tendency requires secondary batteries that serve as a power source of these electronic devices to have higher energy density. Non-aqueous electrolyte secondary batteries, such as lithium ion secondary batteries, are expected to serve as such secondary batteries. Non-aqueous electrolyte secondary batteries are also attracting attention as power batteries for, for example, electric vehicles. As a positive electrode active material for such lithium ion secondary batteries, lithium transition metal complex oxides, such as lithium cobaltate, lithium nickelate, and lithium nickel cobalt manganate, are used.

Various technologies aimed for improving characteristics of positive electrode active materials are known. For example, Japanese Unexamined Patent Application Publication (Translation of PCT Application) No. 2009-526735 describes a method for preparing a positive electrode active material, and the method includes mixing a lithium hydroxide solution into lithium nickel cobalt manganate, and granulating the mixture before firing. According to the publication, the method can achieve high battery capacitance, and improve cycle and rate characteristics. Japanese Patent Application Publication No. 2008-063211 describes a method for preparing a positive electrode active material, and the method includes firing a lithium manganese-based composite oxide obtained through hydrothermal treatment in the presence of a lithium compound. According to the publication, the method can improve charge and discharge characteristics.

SUMMARY

A first aspect is a positive electrode active material for a non-aqueous electrolyte secondary battery that contains a lithium transition metal composite oxide having a spinel structure and containing nickel and manganese. The positive electrode active material includes a first surface region with a molar ratio of nickel to manganese of 0.1 or less on the surface of the lithium transition metal composite oxide.

A second aspect is a method for producing a positive electrode active material for a non-aqueous electrolyte secondary battery. The method includes preparing a base material that contains a lithium transition metal composite oxide having a spinel structure and containing nickel and manganese, contacting the base material with a solution containing a lithium compound with a melting point of 700° C. or less to obtain a lithium-adhered material, and heat-treating the lithium-adhered material at a temperature greater than 250° C. and less than 800° C. to obtain a heat-treated material.

DETAILED DESCRIPTION

As used herein, the term "step" means not only an independent step but also a step which cannot be clearly distinguished from the other steps but that can achieve the desired object. For the amount of each component contained in a composition, when a plurality of substances corresponding to the component are present in the composition, the amount of the component means the total amount of the corresponding substances present in the composition unless otherwise specified. The embodiments of the present invention will now be described in detail. However, the embodiments described below are mere examples of the positive electrode active material for a non-aqueous electrolyte secondary battery and the method for producing the active material for embodying the technical concept of the present invention, and the present invention is not limited to the positive electrode active material for a non-aqueous electrolyte secondary battery and the method for producing the active material described below.

Positive Electrode Active Material for Non-Aqueous Electrolyte Secondary Battery A positive electrode active material for a non-aqueous electrolyte secondary battery according to a first embodiment (hereinafter also simply referred to as "positive electrode active material") contains a lithium transition metal composite oxide having a spinel structure and containing nickel and manganese. The positive electrode active material includes a first surface region with a molar ratio of nickel to manganese of 0.1 or less on the surface of the lithium transition metal composite oxide.

The positive electrode active material containing the lithium transition metal composite oxide including the first surface region with a molar ratio of nickel to manganese of 0.1 or less can exhibit superior output characteristics in a non-aqueous electrolyte secondary battery. This is seemingly because, for example, the presence of the first surface region serves to reduce dispersion resistance of lithium on the particle surface.

The first surface region contains, for example, at least manganese, oxygen, and lithium, and may contain lithium manganese oxide (for example, Li$_2$MnO$_3$). The first surface region may be formed by, for example, solid-solving lithium into a lithium transition metal composite oxide. The molar ratio of nickel to manganese in the first region is, for example, 0.1 or less, preferably 0.07 or less, or less than 0.05, or substantially no nickel may be detected. "Substantially no nickel is detected" means that the amount of nickel is lower than or equal to the detection limit (for example, 1 Atom % or less) of the technique for analyzing the chemical composition of the first surface region. The chemical composition of the substances contained in the first surface region may be analyzed through, for example, energy dispersive X-ray analysis (EDX).

The first surface region may have a chemical composition with a ratio of the number of moles of oxygen atoms to the total number of moles of metals other than lithium of, for example, from 2.4 to 3.8, and preferably from 2.7 to 3.5. The ratio of the number of moles of oxygen atoms to the total number of moles of metals other than lithium in the first surface region is a value where the analysis value through EDX was converted such that the molar ratio of oxygen atoms to the total number of moles of metals other than lithium in the other region than the first surface region is 2.

The first surface region of the lithium transition metal composite oxide may have a thickness of, for example, 0.1 µm or more, preferably 0.15 µm or more, or 0.2 µm or more. Also, the first surface region has a thickness of, for example, 1 µm or less, preferably 0.5 µm or less, or 0.4 µm or less. The thickness of the first surface region may be measured by, for example, identifying the position of the first surface region at a cross-section of the positive electrode active material through chemical composition analysis with EDX line analysis.

The lithium transition metal composite oxide including the first surface region may further include a second surface region where the ratio of nickel to manganese is 0.17 or more. The second surface region may be formed of a lithium-containing transition metal composite oxide having a spinel structure and containing nickel and manganese with, for example, no solid-solution of lithium of the lithium transition metal composite oxide. The second surface region may have a ratio of nickel to manganese of preferably 0.2 or more, or 0.25 or more, and also, for example, 0.5 or less, preferably 0.4 or less, or 0.35 or less.

The lithium transition metal composite oxide including the first surface region may have a volume average particle diameter of, for example, from 1 µm to 20 µm, and preferably from 3 µm to 12 µm. The lithium transition metal composite oxide having a volume average particle diameter within the above range tends to exhibit superior output characteristics. The volume average particle diameter is determined as a particle diameter corresponding to 50% volume accumulation from the small particle diameter side in a particle diameter distribution measured under wet conditions using, for example, a laser diffraction particle diameter distribution measuring device.

The lithium transition metal composite oxide contained in the positive electrode active material has a spinel structure, and contains at least nickel and manganese as transition metals. The lithium transition metal composite oxide may have a chemical composition with a ratio of the number of moles of nickel to the total number of moles of metals other than lithium of, for example, from 0.3 to 0.6, and preferably from 0.4 to 0.5. Also, the lithium transition metal composite oxide may have a chemical composition with a ratio of the number of moles of manganese to the total number of moles of metals other than lithium of, for example, from 1.2 to 1.7, and preferably from 13 to 1.6. Further, the lithium transition metal composite oxide may have a chemical composition with a ratio of the number of moles of nickel to the total number of moles of nickel and manganese of, for example, from 0.15 to 0.30, preferably, from 0.17 to 0.28, and more preferably, from 0.20 to 0.25. The ratio of the number of moles of lithium to the total number of moles of nickel and manganese is, for example, from 0.5 to 0.65. The ratio of the number of moles of oxygen atoms to the total number of moles of nickel and manganese is, for example, from 1.8 to 2.2. The lithium transition metal composite oxide may further contain at least one selected from the group consisting of Al, Mg, Si, Ti, Cr, Fe, Co, Cu, Zn, and Ga in addition to lithium, nickel, and manganese.

The lithium transition metal composite oxide including the first surface region may have a chemical composition represented by, for example, formula (I) below.

$$Li_xNi_pMn_qM^1_rO_4 \quad\quad (I)$$

In the formula, x, p, q, and r satisfy 1≤x≤1.4, 0.3≤p≤0.6, 1.2≤q≤1.7, 0≤r≤0.2, and p+q+r≤2; and M$^1$ is at least one selected from the group consisting of Al, Mg, Si, Ti, Cr, Fe, Co, Cu, Zn, and Ga.

In formula (I), to improve output characteristics, x is preferably 1.05 or more, or 1.1 or more, and also preferably 1.3 or less, 1.25 or less, or 1.2 or less; p is preferably 0.35 or more, or 0.4 or more, and also preferably 0.55 or less, or 0.5 or less; q is preferably 1.3 or more, or 1.4 or more, and also preferably 1.65 or less, or 1.6 or less; and r is preferably 0.03 or more, or 0.05 or more, and also preferably 0.15 or less, or 0.10 or less.

The lithium transition metal composite oxide including the first surface region can be produced by, for example, the method described below. The positive electrode active material for a non-aqueous electrolyte secondary battery contains the lithium transition metal composite oxide including the first surface region in an amount of, for example, 80% by mass or more, and preferably 90% by mass or more.

Electrode for Non-Aqueous Electrolyte Secondary Battery

An electrode for a non-aqueous electrolyte secondary battery includes a current collector, and a positive electrode active material layer containing the above-described positive electrode active material for a non-aqueous electrolyte secondary battery and arranged on the current collector. A non-aqueous electrolyte secondary battery including the electrode may achieve superior output characteristics.

The current collector may be made of, for example, aluminum, nickel, and stainless steel. The positive electrode active material layer can be formed by mixing the positive electrode active material, a conductive material, a binder, and other materials with a solvent to prepare a positive electrode mixture, applying the positive electrode mixture on the current collector, and, for example, drying and pressurizing the mixture. Examples of the conductive material include natural graphite, artificial graphite, and acetylene black. Examples of the binder include polyvinylidene fluoride, polytetrafluoroethylene, and polyamide acryl resin.

Non-Aqueous Electrolyte Secondary Battery

A non-aqueous electrolyte secondary battery including the electrode for a non-aqueous electrolyte secondary battery further includes a negative electrode for a non-aqueous electrolyte secondary battery, a non-aqueous electrolyte, and a separator in addition to the electrode for a non-aqueous electrolyte secondary battery. For these negative electrode, non-aqueous electrolyte, separator, and others to be included in the non-aqueous electrolyte secondary battery, those described, for example, in Japanese Patent Application Publications No. 2002-075367, No. 2011-146390, and No. 2006-012433 (these are incorporated herein by reference in their entireties) may be used as appropriate.

Method for Producing Positive Electrode Active Material for Non-Aqueous Electrolyte Secondary Battery The method for producing the positive electrode active material includes a base material providing step of providing a base material that contains a lithium transition metal composite oxide having a spinel structure and containing nickel and manganese, an adhesion step of contacting the base material with a solution containing a lithium compound with a melting point of 700° C. or less to prepare a lithium-adhered material, and a heat-treatment step of heat-treating the lithium-adhered material at a temperature in the range of greater than 250° C. and less than 800° C. to obtain a heat-treated material. Heat-treating the lithium-adhered material at a specific temperature enables efficient production of a positive electrode active material. A non-aqueous electrolyte secondary battery including the positive electrode active material may exhibit superior output characteristics.

In the base material providing step, a base material is provided. The base material contains a lithium transition metal composite oxide having a spinel structure and containing nickel and manganese. The lithium transition metal composite oxide contained in the base material may be appropriately selected from commercial products, or produced by preparing a composite oxide having a desired chemical composition, and heat-treating the composite oxide together with a lithium compound.

A composite oxide having a desired chemical composition may be prepared, for example, by mixing raw material compounds (for example, a hydroxide and a carbonated compound) in accordance with a target chemical composition, and decomposing the resulting mixture into a composite oxide through heat-treatment, or by a coprecipitation method including dissolving solvent-soluble raw material compounds into a solvent, adjusting, for example, temperature and pH of the resulting solution or adding a complexing agent to the solution in accordance with the desired chemical composition to obtain a precipitate of precursors, and heat-treating the precursors to obtain a composite oxide. An example of the method for producing a base material will now be described.

The method for obtaining a composite oxide by a coprecipitation method may include a seed generation step of adjusting the pH and other parameters of an aqueous solution of mixture containing a desired ratio of metal ions to generate seed crystals, a crystallization step of growing the generated seed crystals to obtain a composite hydroxide having desired characteristics, and a step of obtaining a composite hydroxide by heat-treating the composite hydroxide. For the details of obtaining a composite oxide, refer to, for example, Japanese Patent Application Publications No. 2003-292322 and No. 2011-116580, corresponding to US2012/270107 (A1), which are incorporated herein by reference in their entireties.

In the seed generation step, a liquid medium containing seed crystals may be prepared by adjusting a mixed solution containing a desired ratio of nickel and manganese ions to have a pH of, for example, from 11 to 13. The seed crystals may contain a hydroxide containing, for example, a desired ratio of nickel and manganese. The mixed solution may be prepared by dissolving a nickel salt and a manganese salt in water in a desired ratio. Examples of the nickel salt and the manganese salt include sulfate, nitrate, and hydrochloride. The mixed solution may further contain other metal salts as appropriate in addition to the nickel and manganese salts. The temperature in the seed generation step may be, for example, from 40° C. to 80° C. The atmosphere in the seed generation step may be a low oxidation atmosphere, and preferably maintains, for example, the oxygen concentration at 10% by volume or less.

In the crystallization step, the seed crystals are grown to obtain a precipitate containing nickel and manganese and having desired characteristics. The seed crystals may be grown by adding a mixed solution containing nickel and manganese ions to a liquid medium containing the seed crystals while the pH of the medium is maintained to, for example, from 7 to 12.5, and preferably from 7.5 to 12. The mixed solution is added for, for example, from 1 hour to 24 hours, and preferably from 3 hours to 18 hours. The temperature in the crystallization step is, for example, from 40° C. to 80° C. The atmosphere in the crystallization step is the same as in the seed generation step.

The pH in the seed generation step and the crystallization step may be adjusted using an acidic aqueous solution, such as an aqueous solution of sulfuric acid or an aqueous solution of nitric acid, or an alkaline aqueous solution, such as an aqueous solution of sodium hydroxide or ammonia water.

In the step of obtaining a composite oxide, a composite hydroxide obtained in the crystallization step is heat-treated. The composite hydroxide may be heat-treated at a temperature of, for example, 500° C. or less, and preferably 350° C. or less, and also, for example, 100° C. or more, and preferably 200° C. or more. The composite hydroxide may be heat-treated for, for example, from 0.5 hours to 48 hours, and preferably from 5 hours to 24 hours. The atmosphere of the heat-treatment may be the atmosphere or an oxygen-containing atmosphere. The heat-treatment may be carried out using, for example, a box furnace, a rotary kiln furnace, a pusher furnace, or a roller hearth kiln furnace.

In the heat-treatment step, a lithium-containing mixture obtained by mixing the composite oxide and a lithium compound is heat-treated at a temperature of from 550° C. to 1000° C. to obtain a heat-treated material. The resulting heat-treated material contains a lithium transition metal oxide having a spinel structure and containing nickel and manganese.

Examples of the lithium compound to be mixed with the composite oxide includes lithium hydroxide, lithium carbonate, and lithium oxide. The lithium compound has a particle diameter at 50% in a cumulative particle diameter distribution on volumetric basis of, for example, from 0.1 μm to 100 μm, and preferably from 2 μm to 20 μm.

The ratio of the total number of moles of lithium to the total number of moles of metal elements contained in the composite oxide in the mixture is, for example, from 0.5 to 0.65, and preferably from 0.55 to 0.63. The composite oxide and the lithium compound can be mixed using, for example, a high-speed shear mixer.

The mixture may further contain other metals in addition to lithium, nickel, and manganese. Examples of the other metals include Al, Mg, Si, Ti, Cr, Fe, Co, Cu, Zn, and Ga, and the other metals are composed of preferably at least one selected from the group consisting of these metals, and more preferably at least one selected from the group consisting of Al, Ti, Cr, Fe, and Co. The mixture when containing other metals may be obtained by mixing other metals in the form of a simple substance or a metal compound together with the composite oxide and the lithium compound. Examples of the metal compound containing other metals include oxides, hydroxides, chlorides, nitrides, carbonates, sulfates, nitrates, acetates, and borates.

When the mixture contains other metals, a ratio of the total number of moles of the other metals to the total number of moles of metal elements contained in the composite oxide is, for example, from 1:0.015 to 1:0.1, and preferably from 1:0.025 to 1:0.05.

The mixture may be heated at a temperature of, for example, from 550° C. to 1000° C., preferably from 600° C. to 950° C., and more preferably from 750° C. to 950° C. Although the mixture may be heated at a single temperature, the mixture is preferably heated at multiple temperatures in a stepwise manner to improve discharge capacity at a high voltage. When heated at multiple temperatures, the mixture can be first heated at a temperature of, for example, from 750° C. to 1000° C., and then heated at a temperature of from 550° C. to less than 750° C. The mixture is heated for, for example, from 0.5 hours to 48 hours. When heated at multiple temperatures, the time for each heating can be from 0.2 hours to 47 hours.

The mixture may be heated in the atmosphere or in an oxygen-containing atmosphere. The mixture can be heat-treated in, for example, a box furnace, a rotary kiln furnace, a pusher furnace, or a roller hearth kiln furnace.

A lithium transition metal composite oxide to be used as a base material preferably has a chemical composition represented by, for example, formula (II) below.

$$Li_y Ni_p Mn_q M^1_r O_4 \qquad (II)$$

In the formula, y, p, q, and r satisfy 1≤y≤1.3, 0.3≤p≤0.6, 1.2≤q≤1.7, 0≤r≤0.2, and p+q+r≤2; and $M^1$ is at least one selected from the group consisting of Al, Mg, Si, Ti, Cr, Fe, Co, Cu, Zn, and Ga.

The base material has an average particle diameter of, for example, from 1 µm to 20 µm, and preferably from 3 µm to 12 µm. The base material has a BET specific surface area of, for example, from 0.5 $m^2/g$ to 1.5 $m^2/g$, and preferably from 0.6 $m^2/g$ to 1.3 $m^2/g$. The base material having a BET specific surface area within the above range may contribute to superior output characteristics.

In the adhesion step, the prepared base material and a solution containing a lithium compound with a melting point of 700° C. or less (hereinafter also simply referred to as "lithium solution") are contacted with each other to obtain a lithium-adhered material where the lithium component is adhered to the surface of the base material. The lithium solution may be obtained by dissolving a lithium compound with a melting point of 700° C. or less, such as lithium hydroxide, in a liquid medium, such as water. Using a lithium compound with a melting point of 700° C. or less enables superior output characteristics. Specific examples of the lithium compound with a melting point of 700° C. or less include lithium hydroxide (melting point: 462° C.), lithium acetate (melting point: 286° C.), lithium formate (melting point: 94° C.), lithium chloride (melting point: 605° C.), lithium bromide (melting point: 552° C.), and lithium iodide (melting point: 469° C.). Among these, at least one of lithium hydroxide and lithium acetate is preferably used. The concentration of the lithium compound in the lithium solution is, for example, from 2% by mass to 30% by mass, and preferably from 5% by mass to 25% by mass.

The base material and the lithium solution may be contacted with each other by placing the base material into the lithium solution, followed by stirring as appropriate, or by adding the lithium solution to the base material under stirring. The base material and the lithium solution are contacted with each other at a temperature of, for example, from 0° C. to 100° C., and preferably from 10° C. to 80° C. The duration of the contact is, for example, from 0.1 minutes to 120 minutes, and preferably from 1 minute to 60 minutes.

The fluid volume of the lithium solution to be contacted with the base material is determined such that the amount of lithium contained in the lithium solution relative to the lithium transition metal composite oxide contained in the base material is, for example, from 0.01% by mole to 50% by mol, and preferably from 0.5% by mole to 20% by mol, from 1% by mole to 15% by mol, from 1.5% by mole to 10% by mol, or from 1.5% by mole to 6% by mol.

After the base material and the lithium solution are contacted, drying treatment may be carried out as appropriate. The drying treatment at least partially removes the liquid medium contained in the lithium solution. The drying treatment may be carried out by, for example, heat-treating the mixture of the base material and the lithium solution at from 60° C. to 250° C. Also, the drying treatment may be carried out by, for example, drying under reduced pressure or drying in air.

The adhered amount of the lithium component in the lithium-adhered material in terms of the amount of lithium relative to the lithium transition metal composite oxide contained in the base material is, for example, 0.01% by mole or more, preferably 0.5% by mole or more, 1% by mole or more, or 1.5% by mole or more, and also, for example, 20% by mole or less, preferably 15% by mole or less, 10% by mole or less, or 6% by mole or less. With the adhered amount of the lithium component within the above range, cycle stability tends to improve. The lithium component to be adhered contains components or lithium hydroxide derived from the lithium compound.

In the heat-treatment step, the lithium-adhered material is heat-treated at a temperature in the range greater than 250° C. and less than 800° C. to obtain a heat-treated material. Heat-treating at a specific temperature allows the lithium component adhered to the surface of the base material to solid-solve on the surface of the base material and form the first surface region. The lithium-adhered material is heat-treated at a temperature of preferably 300° C. or more, and more preferably 450° C. or more, and also preferably 750° C. or less, more preferably 700° C. or less, and particularly preferably 650° C. or less. Heat-treating at a temperature within the above range may improve cycle stability.

The lithium-adhered material is heat-treated for, for example, from 0.5 hours to 48 hours, and preferably from 1 hour to 24 hours. The lithium-adhered material may be heat-treated in a predetermined temperature environment, or heat-treated, for example, by increasing the temperature from room temperature to a predetermined temperature, and maintained at that temperature for a predetermined time. When the lithium-adhered material is heat-treated while the temperature is being increased, the rate of the temperature increase may be, for example, from 1° C./min to 15° C./min. The lithium-adhered material is heat-treated in the atmosphere or in an inert gas atmosphere, such as nitrogen.

The heat-treated material has an average particle diameter of, for example, from 1 µm to 20 µm, and preferably from 3 µm to 12 µm.

The heat-treated material obtained through the heat-treatment step is, for example, a lithium transition metal composite oxide having a spinel structure and containing nickel and manganese, and preferably includes the first surface region having a ratio of nickel to manganese of 0.1 or less, preferably 0.07 or less, or less than 0.05 on the surface.

The heat-treated material has a chemical composition with a ratio of the number of moles of nickel to the total number of moles of metals other than lithium of, for example, from 0.3 to 0.6, and preferably from 0.4 to 0.5. Further, the heat-treated material has a chemical composition with a ratio of the number of moles of manganese to the total number of moles of metals other than lithium of, for example, from 1.2 to 1.7, and preferably from 1.3 to 1.6.

The heat-treated material preferably has a chemical composition represented by formula (I) below.

$$Li_xNi_pMn_qM^1_rO_4 \quad (I)$$

In the formula, x, p, q, and r satisfy $1 \leq x \leq 1.4$, $0.3 \leq p \leq 0.6$, $1.2 \leq q \leq 1.7$, $0 \leq r \leq 0.2$, and $p+q+r \leq 2$; and $M^1$ is at least one selected from the group consisting of Al, Mg, Si, Ti, Cr, Fe, Co, Cu, Zn, and Ga.

In the method for producing a positive electrode active material, the heat-treated material obtained through heat-treatment may undergo crushing treatment, or treatment of removing, for example, unreacted materials or by-products through, for example, washing with water. Further, for example, dispersion treatment or classifying treatment may be carried out.

EXAMPLES

The present invention will now be described in detail by way of examples, but the present invention is not limited to these examples.

How the physical properties in the examples and comparative examples were measured will now be described. For each average particle diameter, a cumulative particle diameter distribution on a volumetric basis was measured using a laser diffraction particle diameter distribution measuring device (SALD-3100 by Shimadzu), and a particle diameter at 50% of cumulative volume from the smaller particle diameter side was determined as an average particle diameter (D50).

Example 1

Seed Generation Step 30 kg of water was put into a reaction vessel with stirring, nitrogen gas was purged, and the temperature in the vessel was set to 50° C. The oxygen concentration in the reaction vessel space was maintained at 10% by volume or less. 197 g of a 25% by mass aqueous solution of sodium hydroxide was then added to adjust the pH of the solution within the reaction vessel to 11 or more. A nickel sulfate solution and a manganese sulfate solution were then mixed and adjusted such that the resulting aqueous mixture solution contains nickel and manganese in a molar ratio of 25:75, and that the total ion concentration of nickel and manganese was 1.7 mol/L. To the solution in the reaction vessel under stirring, 4.76 L of the prepared aqueous mixture solution was added to prepare a liquid medium containing seed crystals.

Crystallization Step

After the seed generation step, while the temperature was maintained at 50° C., 70% sulfuric acid was put into the medium to adjust the pH to the range of from 8.9 to 9.2. 452 moles of a 25% by mass aqueous solution of sodium hydroxide and 201 moles of the aqueous mixture solution were each put into the reaction vessel at a constant rate over 18 hours or more. The pH at this time was maintained in the range of from 7.5 to 8.5. Upon completion of the addition, 2.1 kg of a 25% by mass aqueous solution of sodium hydroxide was put into the vessel while the temperature in the reaction vessel was maintained at 50° C. The pH in the reaction vessel at this time was 11.7. The volume average particle diameter. D50 of the resultant nickel- and manganese-containing hydroxide was 6.0 μm. The resulting precipitate was then washed with water and filtered to obtain a composite hydroxide. The resultant composite hydroxide was heat-treated at 300° C. for 12 hours in the atmosphere to, obtain a composite oxide having a compositional ratio of Ni/Mn=0.25/0.75.

Synthesis Step

The resultant composite oxide and the lithium carbonate were mixed in a manner to have a molar ratio Li:(Ni+Mn)=1.1:2 to obtain a raw material mixture. The raw material mixture was heat-treated at 835° C. for 11 hours in the atmosphere, and then at 600° C. for 4 hours to obtain a sintered body. The sintered body was crushed, dispersed using a resin ball mill for 15 minutes, and dry-sieved to obtain a base material as powder. Through the above steps, a lithium transition metal composite oxide represented by the compositional formula: $Li_{1.1}Ni_{0.5}Mn_{1.5}O_4$ and having a volume average particle diameter of 4.5 μm was obtained.

Adhesion Step and Heat-Treatment Step

Lithium hydroxide with a melting point of 462° C. was used as a lithium compound to prepare a 5.7% by mass aqueous solution of lithium hydroxide. To 900 g of the lithium transition metal composite oxide under stirring with a mixer, 2% by mole (in terms of the amount of lithium) of the aqueous solution of lithium hydroxide relative to 40 g of the lithium transition metal composite oxide was added dropwise to obtain a lithium-adhered material. The lithium-adhered material was then heat-treated at 600° C. for 9 hours in the atmosphere. The resultant heat-treated material was dispersed using a resin ball mill so that the material has the same volume average particle diameter as the base material that had undergone the synthesis step, and then dry-sieved to obtain a positive electrode active material containing a Li-treated lithium transition metal composite oxide. The resultant lithium transition metal composite oxide is represented by the compositional formula: $Li_{1.12}Ni_{0.5}Mn_{1.5}O_4$.

Examples 2 to 7

Positive electrode active materials of Examples 2 to 5 were produced in the same manner as in Example 1 except that the heat-treating temperatures and the additive amount of lithium hydroxide were changed as shown in Table 1.

Comparative Example 1

The positive electrode active material of Comparative Example 1 was produced in the same manner as in Example 1 except that no aqueous solution of lithium hydroxide was used in the adhesion step.

Comparative Examples 2 and 3

The positive electrode active materials of Comparative Examples 2 and 3 were produced in the same manner as in Example 1 except that the heat-treating temperatures and the additive amount of lithium hydroxide were changed as shown in Table 1.

Comparative Examples 4 and 5

Adhesion Step and Heat-Treatment Step

Lithium transition metal composite oxides were produced in the same manner as in Example 1. Using lithium carbonate with a melting point of 723° C. as a lithium compound, an aqueous solution of lithium carbonate with 1% by mass concentration of lithium was prepared. To 900 g of the lithium transition metal composite oxide under stirring with a mixer, 134 g (4% by mole relative to the lithium transition metal composite oxide) of the aqueous solution of lithium hydroxide was added dropwise to obtain a lithium-adhered material. The lithium-adhered material was then heat-treated at 600° C. for 9 hours in the atmosphere. The resultant heat-treated material was dispersed using a resin ball mill so that the material has the same volume average particle diameter as the base material that had undergone the synthesis step, and then dry-sieved to obtain a positive electrode active material containing a Li-treated lithium transition metal composite oxide.

TABLE 1

|  | Lithium Compound | Additive amount of lithium (mol %) | Heat-treating temperature (° C.) | DC-IR (Ω) |
|---|---|---|---|---|
| Example 1 | Lithium hydroxide | 2 | 600 | 7.2 |
| Example 2 |  | 4 | 600 | 7.2 |
| Example 3 |  | 5 | 600 | 7.0 |
| Example 4 |  | 8 | 600 | 7.0 |
| Example 5 |  | 12 | 600 | 6.9 |
| Example 6 |  | 4 | 350 | 7.2 |
| Example 7 |  | 4 | 500 | 7.2 |
| Comparative Example 1 | — | — | 600 | 7.5 |
| Comparative Example 2 | Lithium hydroxide | 4 | 250 | 8.9 |
| Comparative Example 3 |  | 4 | 800 | 7.6 |
| Comparative Example 4 | Lithium carbonate | 4 | 450 | 7.6 |
| Comparative Example 5 |  | 4 | 600 | 7.6 |

Chemical Composition Analysis

Figure 2A:
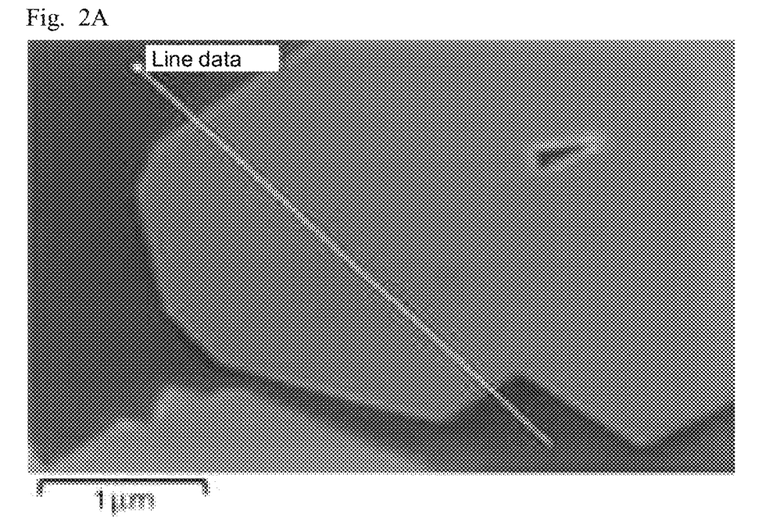
FIG. 2A is an SEM image of a positive electrode active material according to Comparative Example 2 of the present disclosure.
Figure 2B:
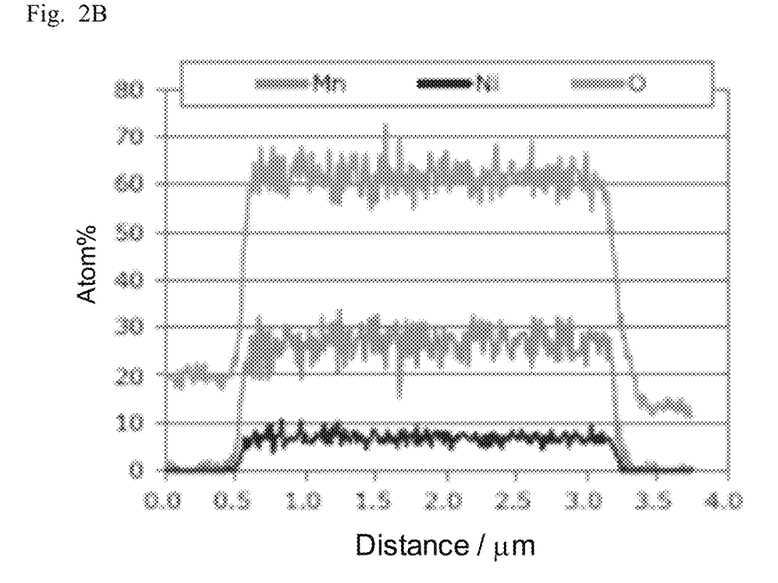
FIG. 2B shows EDX line analysis results of the chemical composition of a positive electrode active material according to Comparative Example 2 of the present disclosure.
Figure 3A:
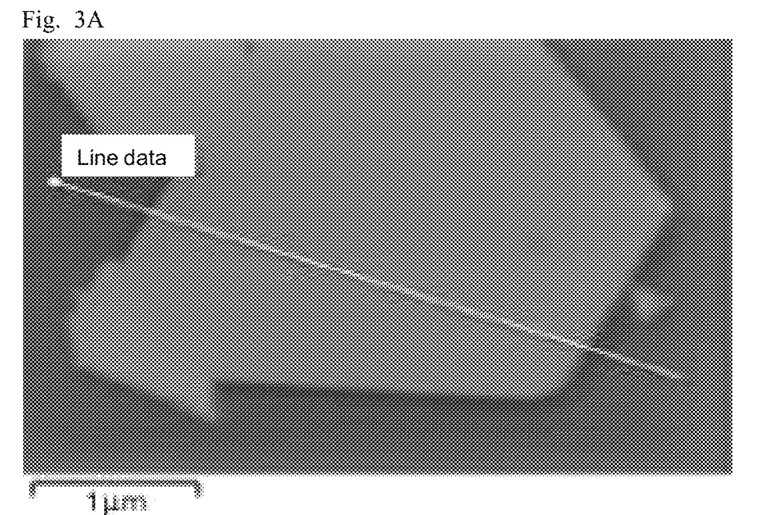
FIG. 3A is an SEM image of a positive electrode active material according to Comparative Example 3 of the present disclosure.

The positive electrode active materials obtained in Example 2 and Comparative Examples 2 and 3 were each dispersed in epoxy resin and solidified, and a cross-section was then created for the secondary particles of each positive electrode active material using a cross section polisher by JEOL to prepare measurement samples. The respective cross-sections of the measurement samples were subjected to chemical composition analysis of the surface region and the inner region through line analysis using a scanning electron microscope/energy dispersive X-ray analysis (SEM/EDX) with an acceleration voltage of 3 kV by Hitachi High Technologies. For the line analysis, lines crossing the cross-sectional surfaces were set, and chemical composition analysis was each carried out along the lines at 0.01 µm intervals. SEM images of the measurement samples with the lines subjected to the line analysis are shown in FIGS. 1A, 2A, and 3A, and the results of the chemical composition analysis through the line analysis are respectively shown in FIGS. 1B, 2B, and 3B.

Figure 1A:
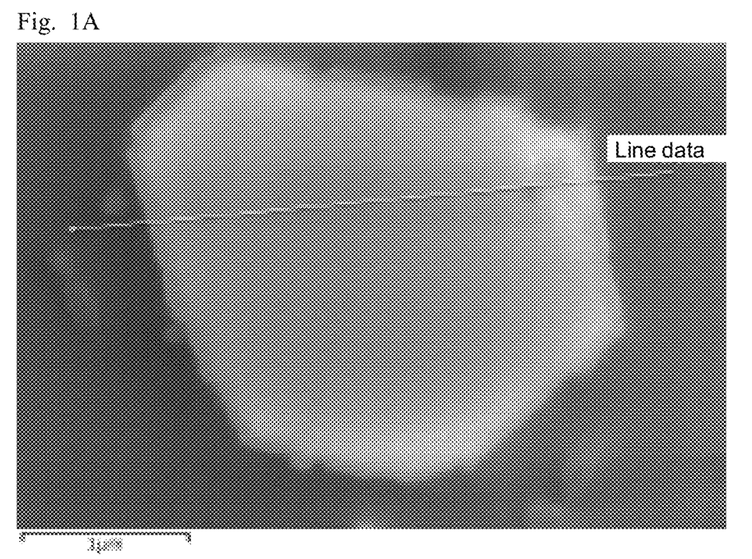
FIG. 1A is a scanning electron microscope (SEM) image of a positive electrode active material according to Example 2 of the present disclosure.
Figure 1B:
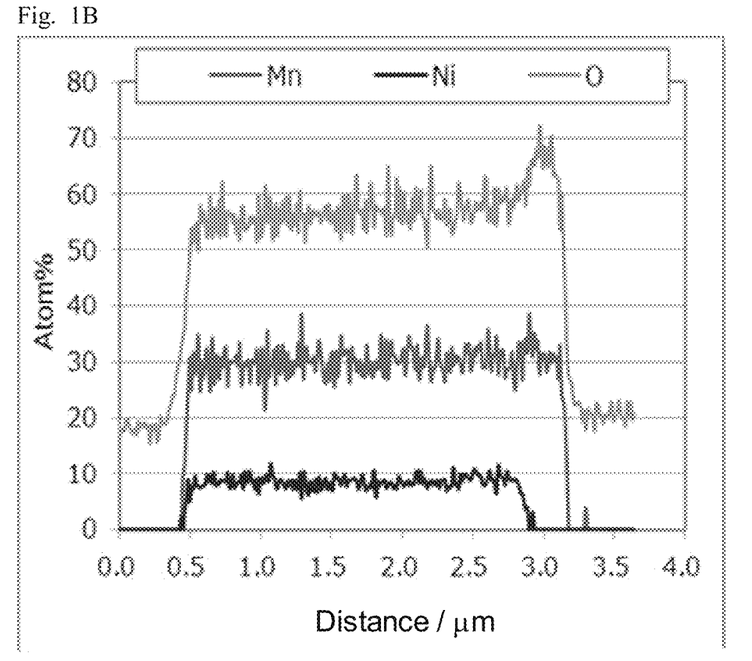
FIG. 1B shows EDX line analysis results of the chemical composition of a positive electrode active material according to Example 2 of the present disclosure.
Figure 3B:
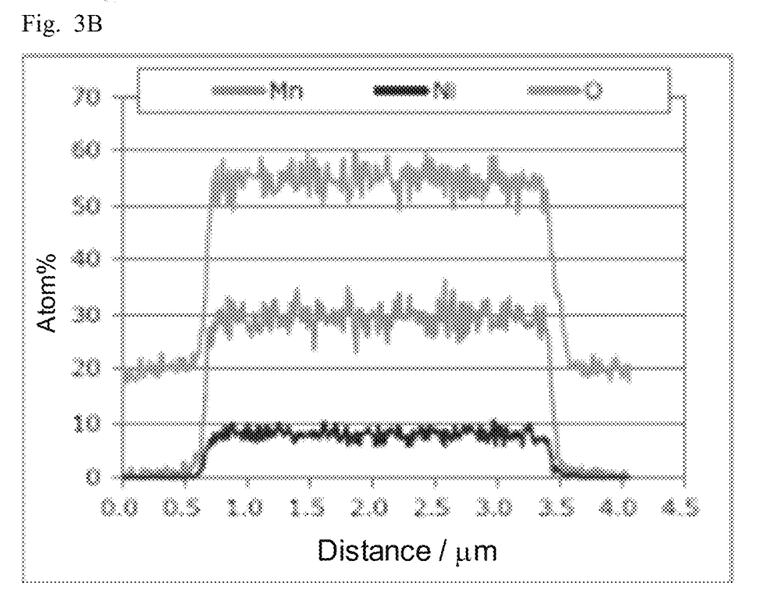
FIG. 3B shows EDX line analysis results of the chemical composition of a positive electrode active material according to Comparative Example 3 of the present disclosure.

FIGS. 1A and 1B respectively show an SEM image and the results of EDX line analysis of the positive electrode active material of Example 2. FIGS. 2A and 2B respectively show an SEM image and the results of EDX line analysis of the positive electrode active material of Comparative Example 2. FIGS. 3A and 3B respectively show an SEM image and the results of EDX line analysis of the positive electrode active material of Comparative Example 3. As shown in FIG. 1B, the positive electrode active material of Example 2 has the first surface region where no nickel was detected from at a distance of about 3.0 µm, which is inside the particle, to at a distance of about 3.3 µm, which is an edge of the particle, from an end of the line. As shown in FIG. 1B, the positive electrode active material of Example 2 has the second surface region from at a distance of about 0.5 µm, which is the other edge of the particle, to at a distance of about 0.8 µm, which is inside the particle, from the end of the line. In contrast, as shown in FIGS. 2B and 3B, the positive electrode active materials of Comparative Examples 2 and 3 have approximately uniform chemical compositions across the lines, and do not have the first surface region where the ratio of nickel to manganese is 0.1 or less. In other words, the first surface region was not formed when heat-treatment temperature was 250° C. or 800° C.

The same line analysis was carried out for the positive electrode active materials of Comparative Examples 4 and 5 where lithium carbonate was used as a lithium compound. Like Comparative Examples 2 and 3, the first surface region was not formed.

For the positive electrode active material of Example 2, the compositions in the first surface region, the second surface region, and the inside region were each calculated from the results of line analysis. The composition of the inside region is an approximate value of analysis for the area approximately in the middle of the line, the compositions of the first surface region and the second surface region are approximate values of analysis for the areas approximately in the middle of the lines for the first surface region and the second surface region. Table 2 shows the percentage contents of Ni, Mn, and O (Atom %) calculated from the EDX line analysis. In Table 2, Me refers to metals other than lithium, specifically, Ni and Mn. An O/Me converted value is a value converted from an analysis value when the O/Me value of a theoretical composition of a Ni- and Mn-containing lithium transition metal composite oxide, for example, $LiNi_{0.5}Mn_{1.5}O_4$ is taken as 2.

TABLE 2

|  | Atom % | | | | O/Me | O/Me converted value |
|---|---|---|---|---|---|---|
|  | Ni | Mn | Me | O | | |
| Inner region | 10 | 30 | 40 | 60 | 1.5 | 2 |
| First surface region | 0 | 30 | 30 | 70 | 2.3 | 3.1 |
| Second surface region | 10 | 30 | 40 | 60 | 1.5 | 2 |

In the first surface region, substantially no Ni was detected. The O/Me converted value in the first surface region of about 3 seemingly means that a lithium manganese oxide, for example, $Li_2MnO_3$, was generated in the first surface region.

X-Ray Diffraction XRD Analysis

Figure 4:
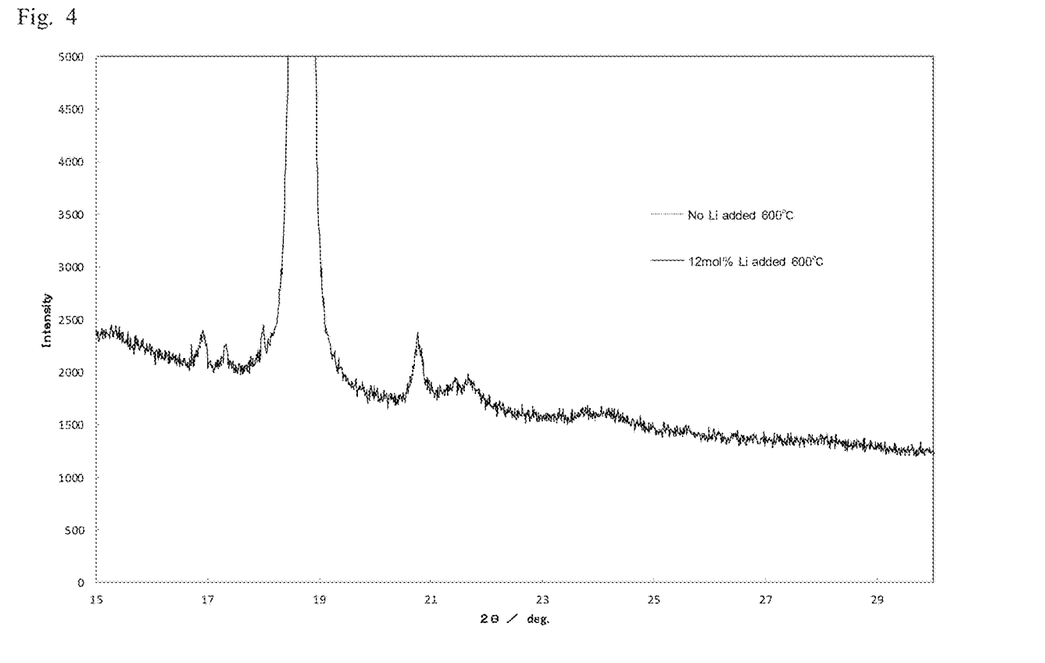
FIG. 4 shows X-ray diffraction analysis results of positive electrode active materials according to Example 5 and Comparative Example 1.

For the positive electrode active materials of Example 5 and Comparative Example 1, an X-ray diffraction spectrum was each obtained using CuKα rays (tube current: 200 mA, tube voltage: 45 kV). FIG. 4 shows the results.

FIG. 4 confirms that the positive electrode active material of Example 5 has a peak at around 21° seemingly derived from $Li_2MnO_3$.

Fabrication of Batteries for Evaluation

Batteries for evaluation were prepared using the positive electrode active materials obtained above through the procedures described below.

Preparation of Positive Electrode 90 parts by mass of a positive electrode active material, 5 parts by mass of acetylene black, and 5 parts by mass of polyvinylidene fluoride (PVDF) were dispersed in N-methyl-2-pyrrolidone (NMP) to prepare a positive electrode mix. The positive electrode mix was applied on an aluminum foil current collector, dried, compression-molded with a roller press, and then cut into a predetermined size to prepare a positive electrode.

Preparation of Negative Electrode 97.5 parts by weight of artificial graphite, 1.5 parts by weight of carboxymethyl cellulose, and 1.0 part by weight of styrene-butadiene rubber (SBR) were dispersed in water, and dissolved to obtain negative electrode slurry. The negative electrode slurry was applied on a copper foil current collector, dried, compression-molded with a roller press, and then cut into a predetermined size to prepare a negative electrode.

Fabrication of Batteries for Evaluation

A lead electrode was adhered to each of the current collectors of the positive and negative electrodes, and a separator was then arranged between the positive electrode and the negative electrode. These members were placed into a laminated pouch pack, and the pouch pack was then vacuum-dried at 65° C. to remove moisture adsorbed on the members. Into the laminated pouch pack, an electrolyte was then injected in an argon atmosphere, and the pack was sealed to prepare a battery for evaluation. The electrolyte was prepared by mixing ethylene carbonate (EC) and methyl ethyl carbonate (MEC) in a volume ratio of 3:7, and dissolving lithium hexafluorophosphate ($LiPF_6$) in the mixture to have a concentration of 1 mol/l. The resultant battery for evaluation was put into a temperature controlled bath (25° C.), aged with a weak current, and subjected to the evaluations below.

Measurement of DC Internal Resistance

Each aged battery for evaluation was placed in an environment at −25° C., and its DC internal resistance (DC-IR) was measured. A constant electric current was charged to a charge depth of 50% to the battery with a full charge voltage of 4.75 V, pulse electric discharge was then carried out for 10 seconds with a specific current i, and the voltage V at $10^{th}$ second was measured. The measured values were plotted on the points of intersection with current i on the horizontal axis and voltage V on the vertical axis, and the slope of the line connecting the points of intersection was determined as DC internal resistance (DC-IR). Current i=0.03 A, 0.05 A, 0.08 A, 0.105 A, and 0.13 A. A low DC-IR means good output characteristics. Table 1 shows the results.

As shown in Table 1, batteries for evaluation including a positive electrode that contains a positive electrode active material including the first surface region had a low DC internal resistance, and exhibited superior output characteristics.

Capacity Maintenance

An electric charge and discharge cycle test was carried out under a temperature condition of 60° C. In the charge and discharge cycle test, one cycle consisted of charging at a constant current of 1.0 C (1 C=a current that completes discharge in one hour) up to the upper charge voltage limit of 4.75 V and discharging at a constant current of 1.0 C down to the lower discharge voltage limit of 3.5 V, and 100 cycles in total were carried out. For each cycle, discharge capacity was measured, and the capacity maintenance ratio (%) in 100 cycles was calculated using the expression: ($100^{th}$ cycle discharge capacity/$1^{st}$ cycle discharge capacity)×100. Good durability means good life cycle characteristics. Table 3 shows the results with corresponding DC internal resistances.

TABLE 3

| | Additive amount of lithium (mol %) | DC-IR (Ω) | Capacity maintenance ratio (%) |
|---|---|---|---|
| Example 1 | 2 | 7.2 | 65 |
| Example 2 | 4 | 7.2 | 66 |
| Example 3 | 5 | 7.0 | 67 |
| Comparative Example 1 | — | 7.5 | 64 |

As Table 3 shows, the batteries for evaluation including a positive electrode that contains a positive electrode active material including the first surface region demonstrated improved capacity maintenance as well as output characteristics.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a non-aqueous electrolyte secondary battery, the active material comprising:
a lithium transition metal composite oxide having a spinel structure and containing nickel and manganese, the lithium transition metal composite oxide having a surface including a first surface region and a second surface region,
wherein the first surface region has a chemical composition with a molar ratio of nickel to manganese of 0.1 or less,
wherein the first surface region has a thickness of from 0.15 μm to 1 μm,
wherein the first surface region contains a lithium manganese oxide,
wherein the first surface region is formed by solid-solving lithium into the lithium transition metal composite oxide, and
wherein the second surface region has a chemical composition with a molar ratio of nickel to manganese of 0.17 or more.

2. The positive electrode active material according to claim 1, further comprising a second surface region having a chemical composition with a molar ratio of nickel to manganese of 0.2 or more.

3. The positive electrode active material according to claim 2, wherein the first surface region has a chemical composition with a ratio of a number of moles of oxygen atoms to a total number of moles of metals other than lithium of from 2.4 to 3.8.

4. The positive electrode active material according to claim 2, wherein the lithium transition metal composite oxide has a molar ratio of nickel of 0.3 to 0.6 when a total number of oxygen atoms in a composition of the lithium transition metal composite oxide is 4.

5. The positive electrode active material according to claim 4, wherein the lithium transition metal composite oxide has a molar ratio of manganese of 1.2 to 1.7 when the total number of oxygen atoms in the composition of the lithium transition metal composite oxide is 4.

6. The positive electrode active material according to claim 2, wherein the lithium transition metal composite oxide has a chemical composition represented by formula below:

$Li_xNi_pMn_qM^1_rO_4$ where x, p, q, and r satisfy $1 \leq x \leq 1.4$, $0.3 \leq p \leq 0.6$, $1.2 \leq q \leq 1.7$, $0 \leq r \leq 0.2$, and $p+q+r \leq 2$; and $M^1$ is at least one selected from the group consisting of Al, Mg, Si, Ti, Cr, Fe, Co, Cu, Zn, and Ga.

7. The positive electrode active material according to claim 1, wherein the first surface region has a chemical composition with a ratio of a number of moles of oxygen atoms to a total number of moles of metals other than lithium of from 2.4 to 3.8.

8. The positive electrode active material according to claim 1, wherein the lithium transition metal composite oxide has a chemical composition represented by formula below:

$Li_xNi_pMn_qM^1_rO_4$ where x, p, q, and r satisfy $1 \leq x \leq 1.4$, $0.3 \leq p \leq 0.6$, $1.2 \leq q \leq 1.7$, $0 \leq r \leq 0.2$, and $p+q+r \leq 2$; and $M^1$ is at least one selected from the group consisting of Al, Mg, Si, Ti, Cr, Fe, Co, Cu, Zn, and Ga.

9. The positive electrode active material according to claim 1, wherein the lithium transition metal composite oxide has a molar ratio of nickel of 0.3 to 0.6 when a total number of oxygen atoms in a composition of the lithium transition metal composite oxide is 4.

10. The positive electrode active material according to claim 1, wherein the lithium transition metal composite oxide has a molar ratio of manganese of 1.2 to 1.7 when a total number of oxygen atoms in a composition of the lithium transition metal composite oxide is 4.

* * * * *